(12) United States Patent
Bareis

(10) Patent No.: US 6,731,750 B1
(45) Date of Patent: May 4, 2004

(54) XDSL MULTIPLE-POINT INTERFACE DEVICE

(75) Inventor: Bernard F. Bareis, Plano, TX (US)

(73) Assignee: TeraForce Technology Corporation, Richardson, TX (US)

( * ) Notice: Subject to any disclaimer, the term of this patent is extended or adjusted under 35 U.S.C. 154(b) by 0 days.

(21) Appl. No.: 09/183,091

(22) Filed: Oct. 30, 1998

(51) Int. Cl.⁷ .................................. H04M 9/08
(52) U.S. Cl. .................. 379/399.01; 379/413; 379/377
(58) Field of Search .................. 379/413, 399.01, 379/399.02, 93.01, 93.05, 93.07, 93.09, 377

(56) References Cited

U.S. PATENT DOCUMENTS

| | | | |
|---|---|---|---|
| 5,848,150 A | * 12/1998 | Bingel | 379/399.01 |
| 6,115,466 A | * 9/2000 | Bella | 379/399.01 |
| 6,137,866 A | * 10/2000 | Staber et al. | 379/413.03 |
| 6,301,337 B1 | * 10/2001 | Scholtz et al. | 379/93.06 |

* cited by examiner

Primary Examiner—Minsun Oh Harvey
Assistant Examiner—Jefferey Harold
(74) Attorney, Agent, or Firm—Howison & Arnott, L.L.P.

(57) ABSTRACT

Multipoint interface devices (MPID) for digital subscriber line environments are provided. In one embodiment an MPID is provided for each item of customer premises equipment that is connected to the telephone line. An MPID may include a signal transform device having a particular signal transform function. For example, a low band MPID individually adapts each voice band device such as a telephone set, facsimile machine, PBX machine, or the like, to a standard telephone line. A high band MPID individually adapts high speed digital modem devices including ADSL, RADSL or HDSL to a customer's telephone line. Thus, each item of equipment is connected in parallel through an appropriate MPID to a common telephone line. In another embodiment an interface device includes selectable low-band and high-band MPIDs. In another embodiment, an MPID includes means for automatically engaging the MPID only when the affected line is in use.

13 Claims, 3 Drawing Sheets

XDSL MULTIPLE-POINT INTERFACE DEVICE

TECHNICAL FIELD OF THE INVENTION

The present invention relates generally to telecommunications equipment, and more particularly to customer premise interfaces for digital subscriber line devices.

BACKGROUND OF THE INVENTION

Modems for digital subscriber line ("DSL") applications require a signal transform device such as a bandpass filter, low-pass or high-pass filter, or other network having a signal transform function for providing a signal coupling interface to existing customer premise equipment. Such modem devices include ADSL modems, RADSL modems, HDSL modems, and the like. xDSL is a common acronym used to describe a wide range of digital subscriber loop technologies such as ADSL, RADSL and HDSL. As is well known, ADSL is an acronym for Asymmetric Digital Subscriber Line; similarly RADSL signifies Rate Adaptive Digital Subscriber Line and HDSL signifies High Speed Digital Subscriber Line. The aforementioned signal transform device may be used for example, to allocate spectral bandwidth among standard telephone equipment, generally including low-speed devices, and high-speed digital modem equipment. Conventional signal transform devices may be installed at the customer premise demarcation point. The demarcation point is the location in the customer's building where the telephone company lines tie into the internal lines owned, rented or leased by the customer. Signal transform devices connect in series between each telephone company line and each respective customer line. By connecting in series, the signal transform device routes the xDSL signals to a xDSL modem and allows the standard loop start telephone signals to operate to and from telephone sets, PBXs or equivalent voice-band equipment.

The series-only interconnection of conventional signal transform devices requires consumers to pay for costly installation by qualified telephone equipment service personnel. In addition, separate wiring must be installed between the signal transform device at the demarcation point and the xDSL modem. Separate wiring for the xDSL modem further adds to the installation cost and complexity when using conventional xDSL signal transform devices.

If a means is provided to enable users to install xDSL modem equipment without the need for expert installation personnel and if such means additionally enables the user to install the xDSL equipment in any location having the existing line interface jack, then added installation cost and inconvenient installation will no longer be required. The present invention overcomes the disadvantages and inefficiencies associated with existing xDSL signal transform devices by providing a device having an interface structure that enables easy, low-cost installation by the user. Instead of interconnecting in series between the telephone company central office and both the customer premise telephone equipment and the xDSL modem, the present invention may provide separate interfaces for each piece of customer equipment. Separate interfaces enable the user to install the xDSL modem wherever there is an available line interface jack.

SUMMARY OF THE INVENTION

User installation and removal for servicing of xDSL interface devices is an important consideration for user acceptance. The present invention overcomes the disadvantages and inefficiencies associated with using conventional xDSL signal transform device technologies by enabling the user to easily install the interface device at a lower cost in the user's present system. The preferred xDSL signal transform device installation is implemented by having one version of the device for connecting standard loop start telephones sets, PBXs, other analog telephone equipment and the like while providing another version to connect the xDSL modem equipment. The present invention therefore provides a variety of user installable xDSL signal transform devices which can be installed at an existing line interface jack on the customer premises.

A minimal configuration of the xDSL Multiple-Point Interface Device (MPID), also named hereinbelow as a signal coupling interface or signal coupler, consists of one type of signal transform device for the xDSL modem, for example a high speed device, and a different type of signal transform device for the user's telephone set, for example a low speed device. A preferred embodiment of the present invention provides interconnection to the telephone line via both an individual xDSL MPID at each telephone set and each piece of xDSL equipment. Thus each such item of equipment is individually isolated and placed in parallel with other individual telephone sets and/or xDSL equipments connected to the telephone line.

Another preferred embodiment of the present invention enables both low-band and high-band filters, networks or other signal transform devices to be selectively coupled in the telephone line responsive to conditions existing in the customer system or on the subscriber line. In one such enhanced MPID or signal coupling device a filter may be placed in the circuit upon activation of the hook switch in a connected customer device. In another such enhanced MPID or signal coupling device a filter may be alternatively connected into a circuit feeding a customer device or bypassed in response to loading changes sensed on the subscriber line.

The foregoing should be construed as merely illustrative of the pertinent features and applications of the present invention. Many other beneficial results can be obtained by applying the present invention in a different manner or modifying the embodiments described. Accordingly, a fuller understanding of the present invention may be obtained by referring to the following Drawings and Detailed Description of the preferred embodiments.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE INVENTION

It will be appreciated in the following description that operation of the Digital Subscriber Line (DSL) signal coupler of present invention is shown by way of example in an ADSL environment. It likewise is understood that the present invention is useful for RADSL, HDSL, and similar environments with certain enhanced features as will be described.

A Digital Subscriber Line (xDSL) signal coupler includes a first transmission branch for a first signal and one or more secondary branches each carrying secondary signals, the first and secondary branches being coupled to a common transmission line. The first signal is characterized by having a first frequency spectrum and the secondary signals are characterized by having a second frequency spectrum, wherein the first and second frequency spectra are non-overlapping. The first transmission branch thereby includes the cascade coupling of a first signal means and a first bandpass filter both adapted to said first frequency spectrum, and the second transmission branch being one branch or each of a plurality of secondary branches each including a respective cascade coupling of a signal means and a bandpass filter all adapted to said second frequency spectrum.

Figure 3:
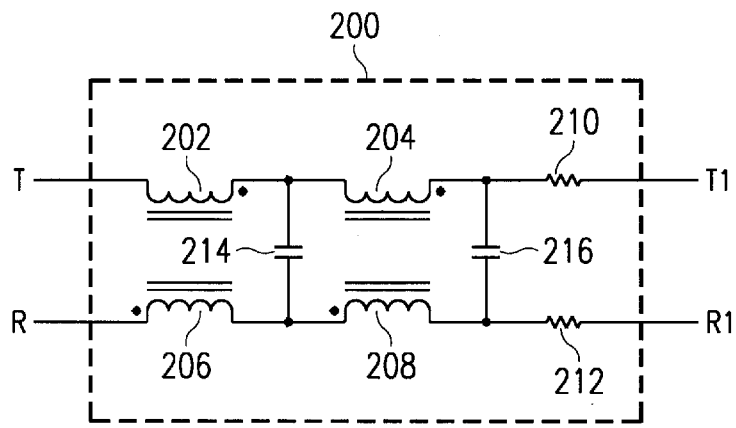
FIG. 3 is a detailed component diagram of the xDSL Multiple-Point Interface Device section of FIG. 1 and FIG. 2 that connects standard telephone equipment to a xDSL capable telephone line.
Figure 4:
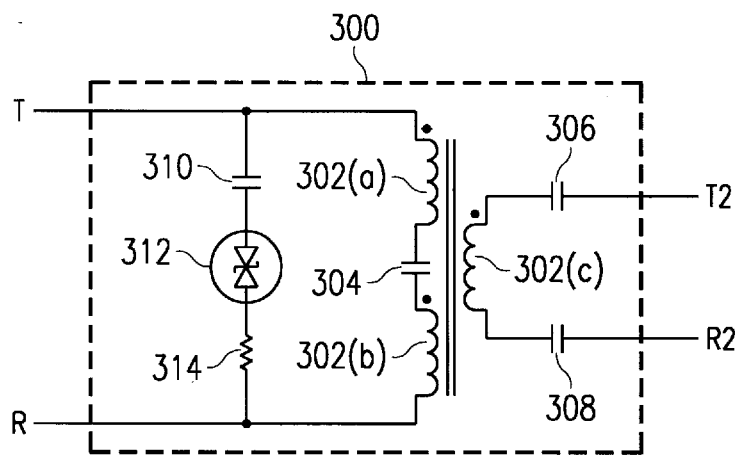
FIG. 4 is a detailed component diagram of the xDSL Multiple-Point Interface Device section of FIG. 1 and FIG. 2 that connects an ADSL, RADSL, HDSL modem or the like to a compatible telephone line.

Referring to the embodiment shown in FIG. 1, the xDSL Multiple-Point Interface Device, hereinafter referred to as MPID 20(a) . . . (n) and MPID 22, is preferably implemented in the customer premises wiring 10 of a typical home or small office environment. Such environment typically includes a plurality of equipment for placing various types of telephone calls such as facsimile, voice calls, and the like. Each of the various types of telephone equipment are illustrated by the telephone sets 12(a) . . . (n). An MPID is capable of operating an xDSL device on one branch using the MPID circuit 300 of FIG. 4 and each of a plurality of secondary branches is operated using separate applications of the MPID circuit 200 of FIG. 3. FIG. 3 shows a detailed diagram of the standard telephone equipment interface section of the MPID of FIG. 1 and FIG. 2. FIG. 4 shows a detailed diagram of the ADSL modem interface section of the MPID of FIG. 1 and FIG. 2.

Figure 1:
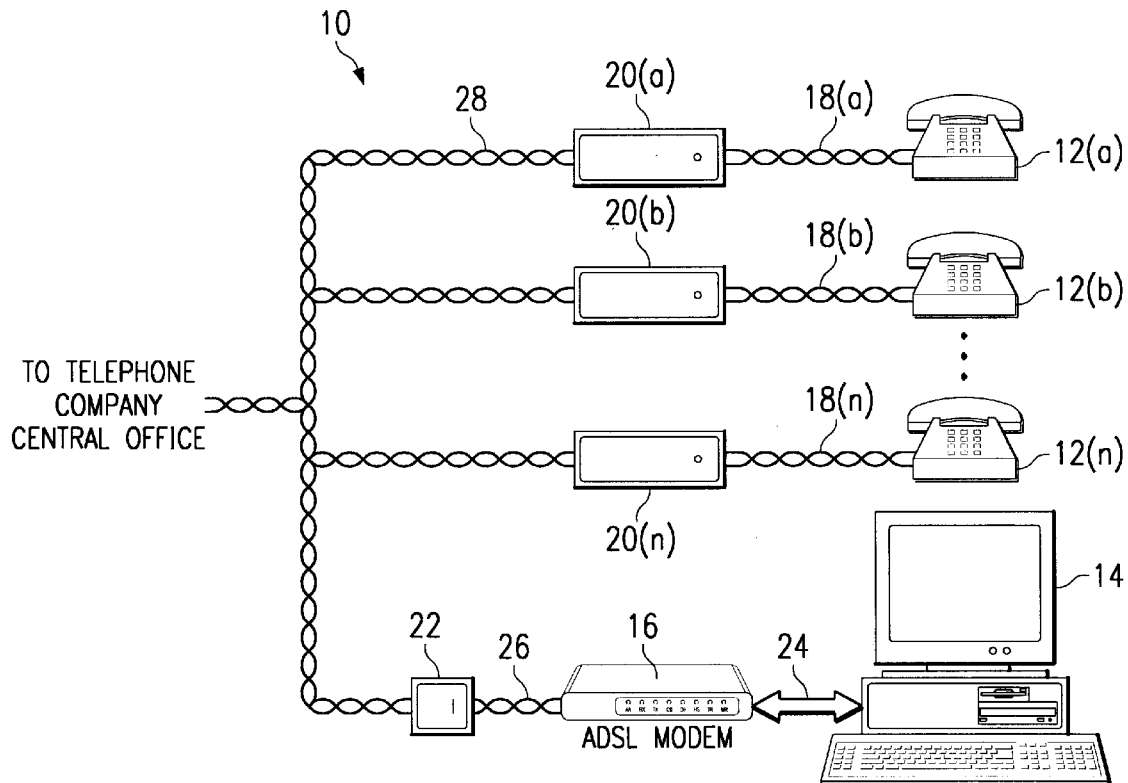
FIG. 1 is a diagram illustrating a first embodiment of the present invention.

The embodiment of the present invention shown in FIG. 1 is connected separately between the customer premise wiring 10 and each piece of attached equipment 12(a) . . . (n), whether ADSL modem, standard telephone set, facsimile equipment, PBX, or the like. In FIG. 1, two dependent MPID section types are shown. One MPID section type 20(a) . . . (n) is connected between telephone sets or equivalent loop start equipment and the telephone line. The other section type, MPID 22, is connected between the ADSL modem and the telephone line. The different dependent section types are designed to provide proper separation of signals on the telephone line for loop start equipment, such as telephone sets 12(a) . . . (n), and for signals pertaining to operation of the ADSL modem 16. The function of the MPID section type 20(a) . . . (n) is to enable loop start telephone signaling, such as ringing and talk battery for voice communications, to respectively operate telephone sets 12(a) . . . (n) without interference from the ADSL modem 16. The function of MPID section type 22 is to pass ADSL modem frequencies above 4 KHZ along telephone line 28 while blocking the DC voltage talk battery used by the plurality of telephone sets 12(a) . . . (n). Telephone line 28 is typically implemented as twisted pair cable.

Figure 5:
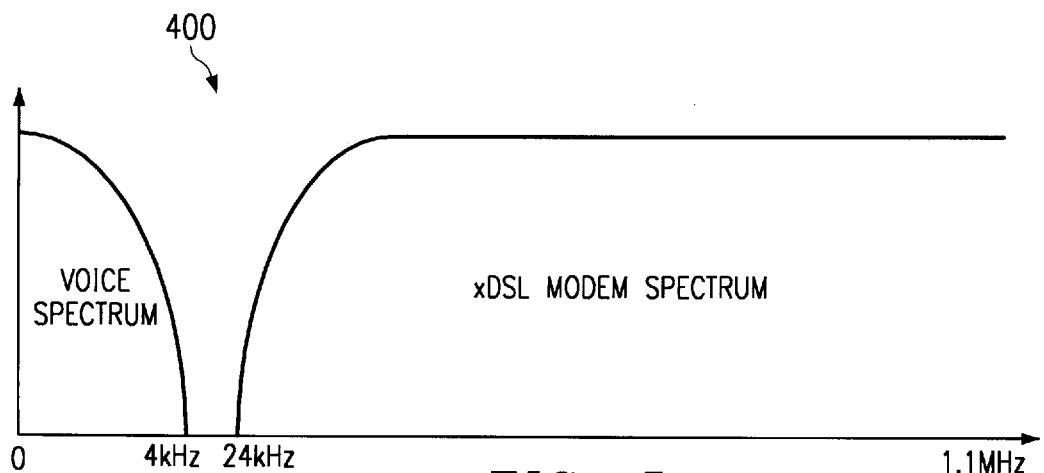
FIG. 5 is a graph showing a telephone line spectrum allocation for a xDSL Multiple-Point Interface Device.

Continuing with FIG. 1, telephone sets 12(a) . . . (n) are respectively connected through standard silver satin cables 18(a) . . . (n) to MPID section type 20(a) . . . (n) which is, in turn, connected to the telephone line 28 consisting, for example, of twisted pair cable. The telephone line 28 connects to the telephone company local central office in order to establish voice band communications in the frequency range of 0 Hz to 4 kHz, although the spectrum is typically further reduced to the range of 200 Hz to 3.4 kHz by electronic codec filters in the central office switching system. In addition to passing voice band frequencies, DC signaling and ringing signals are also passed by the MPID section type 20(a) . . . (n). As will be described hereinafter, typical frequency system allocations of the telephone line for the voice band and for xDSL are shown in FIG. 5.

In operation, the ADSL modem 16 of FIG. 1 is employed, for example, to transfer digital data at up to 6 Mbps or more from the computer system 14 to the telephone line 28. The digital data from computer system 14 is transferred through interconnecting cable 24 to the ADSL modem 16. The ADSL modem 16 is connected via interconnecting cable 26 to the MPID type 22. High speed ADSL data transferred in the analog domain over the telephone line 28 passes through the MPID type 22. As previously stated, the function of MPID 22 is to pass ADSL modem frequencies above 4 kHz along telephone line 28 while blocking the DC voltage talk battery used by the plurality of telephone sets 12(a) . . . (n).

Figure 2:
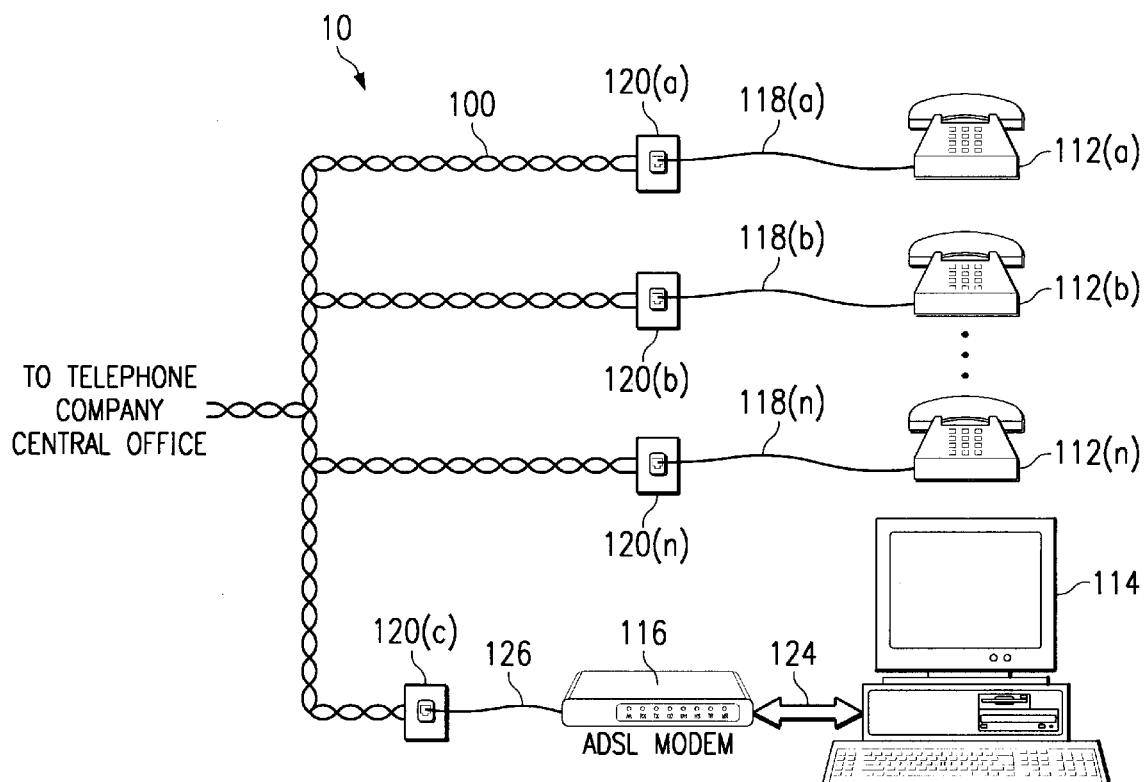
FIG. 2 is a diagram illustrating a second embodiment of the present invention.

Referring now to FIG. 2, there is illustrated a second embodiment of the present invention. FIG. 2 shows the MPID 120(a) . . . (n) implemented as wall mount connector plates including the necessary filtering circuitry. The MPID 120(a) . . . (n) of FIG. 2 are implemented in the customer premises wiring 10 that typically includes a plurality of equipment for placing various types of telephone calls such as facsimile, voice calls, and the like. A switch attached to the wall plate may be used to select either circuit 200 as shown in FIG. 3 or circuit 300 as shown in FIG. 4 depending on the type of attached device. Alternatively, the connection can be switched using different connectors for each type of associated device; one type of connector for an attached xDSL modem and another type of connector for an attached telephone set, facsimile machine, or the like.

Referring further to FIG. 2, telephone sets 112(a) . . . (n) are respectively connected through standard silver satin cables 118(a) . . . (n) to MPID section type 120 (a) . . . (n) which is, in turn, connected to the telephone line 100 consisting, for example, of twisted pair cable. The telephone line 100 connects to the telephone company local central office in order to establish voice band communications. In addition to passing voice band frequencies, DC signaling and ring signals are also passed by the MPID section type 120(a) . . . (n). The voice spectrum allocation for the preferred embodiment is provided by circuit 200 illustrated in FIG. 3; similarly, the xDSL modem spectrum is provided by circuit 300 illustrated in FIG. 4.

In operation, the ADSL modem 116 is employed to transfer digital data at up to 6 Mbps or more from the computer system 114 through interconnecting cable 124, ADSL modem 116, and interconnecting cable 126 to the MPID type 120. High speed ADSL data transferred in the analog domain and received over telephone line 100 passes through the MPID type 120. The function of MPID type 120 is to pass ADSL modem frequencies above 24 kHz along telephone line 100 while blocking the DC voltage talk battery used by the plurality of telephone sets 112(a) . . . (n).

Referring now to FIG. 3 there is illustrated an exemplary component diagram of the MPID type 20(a) . . . (n) referenced in FIG. 1 and of the voice spectrum portion of MPID 120(a) . . . (n) of FIG. 2. The MPID section 200 of FIG. 3 is a low pass filter configured to enable proper telephone circuit operation while maintaining necessary filter parameters. The circuit allows loop current to flow in path R–R$_1$ including inductor 206, inductor 208, and resister 212 and through return path T1–T including resistor 210, inductor 204 and inductor 202 when attached to a telephone set or equivalent device at terminals R1 and T1. Design constraints of this filter are critical in order to maintain proper line impedance and line balance, while passing direct current and providing the correct off-hook DC resistance. Moreover, the filter of MPID section 200 must provide the required ADSL signal filtering without adversely affecting either the ADSL signal or the signal path through to the attached telephone set. In addition to providing a direct current path, the circuit of MPID section 200 permits passage of ring signaling. Ring signaling is typically 20 Hz to 30 Hz alternating current at an amplitude ranging from 70 Vrms to 105 Vrms.

The filter of an exemplary MPID section 200 is a low pass filter comprising eight circuit elements. These elements include inductor 202, inductor 206, capacitor 214, inductor 204, inductor 208, capacitor 216, resistor 210 and resistor 212. The values of the elements of the exemplary circuit 200 of MPID section are chosen to maintain proper telephone line operating characteristics with a typical telephone set load impedance of 600 ohms. The circuit 200 further passes ring signaling and direct current power for proper telephone set operation, maintains in excess of 10 megohms DC resistance in the on-hook state, and maintains the total off-hook DC resistance of less than 300 ohms. To keep xDSL signals from interfering with telephone conversations, the circuit 200 also provides a passband ripple no greater than plus or minus 0.5 dB and a stop-band attenuation greater than 10 dB at 15 kHz and greater than 75 dB at 30 kHz.

Referring now to FIG. 4, an exemplary circuit of the MPID type 22 of FIG. 1 and the xDSL modem spectrum section of MPID type 120(a) . . . (n) of FIG. 2 is shown. The function of circuit 300 of FIG. 4 is to provide a high pass filter for the xDSL frequency band while removing the direct current and providing protection from ring signaling for the attached xDSL modem. Further, the circuit 300 provides a maintenance signature to enable the telephone company central office to determine whether or not a xDSL modem is attached to the line.

The maintenance signature of circuit 300 is formed by capacitor 310, diac or dual zener diode 312 and resistor 314. The maintenance signature produced by these components is unique and is specifically designed for xDSL modems. Transformer windings 302(a), 302(b) and 302(c), and capacitors 304, 306 and 308 provide high pass filtering, direct current blocking, and reduce ring signaling current so that it is not damaging to the attached xDSL modem.

It is well known in the art that filter characteristics vary with changes in terminating impedances. Such changes in impedance occur when a telephone device goes on-hook or off-hook. The integrity of high speed data is subject to degradation by such impedance variation, becoming more pronounced as the number of off-hook devices coupled to a common telephone line increases. Thus, the importance of providing signal couplers which minimize these impedance loading effects on the filter characteristics of the signal couplers will be appreciated. The embodiments of the present invention solve this problem in two ways. In one embodiment, the signal couplers may be individually controlled or packaged for quick connect/disconnect use with individual telephone line branch circuits. If loading effects become troublesome, a signal coupler may be easily removed or deselected. In another embodiment to be discussed hereinbelow, the signal coupler may include automatic means responsive to the off-hook and on-hook signals to bypass or insert the signal coupler or other signal transform device. This feature enables all coupled lines to be in a bypass condition except when the line is in use thus minimizing the loading effects that may degrade signals on the line.

While the preferred embodiments of the present invention are illustrated using passive components only, the use of two or more telephone sets on a customer line suggests the need for an active design that would only place additional filtering on the line when an attached telephone set is taken off-hook. For example, when two or more telephone sets are off-hook simultaneously, degradation to the xDSL modem signal can occur when using passive solutions. An active loop current detector circuit is then utilized in a MPID to determine when a telephone set is off hook and then connect additional filtering to the line as needed. Using an active solution which places, for example, low pass filters in series with each telephone set as needed enables maintaining the highest possible data rates. The drawback of using an active circuit is the additional cost associated thereby. However, volume production minimizes such cost. In either embodiment shown in FIG. 1 and FIG. 2, the circuit 300 of FIG. 4 may be alternatively included internally in the xDSL modem.

Figure 6:
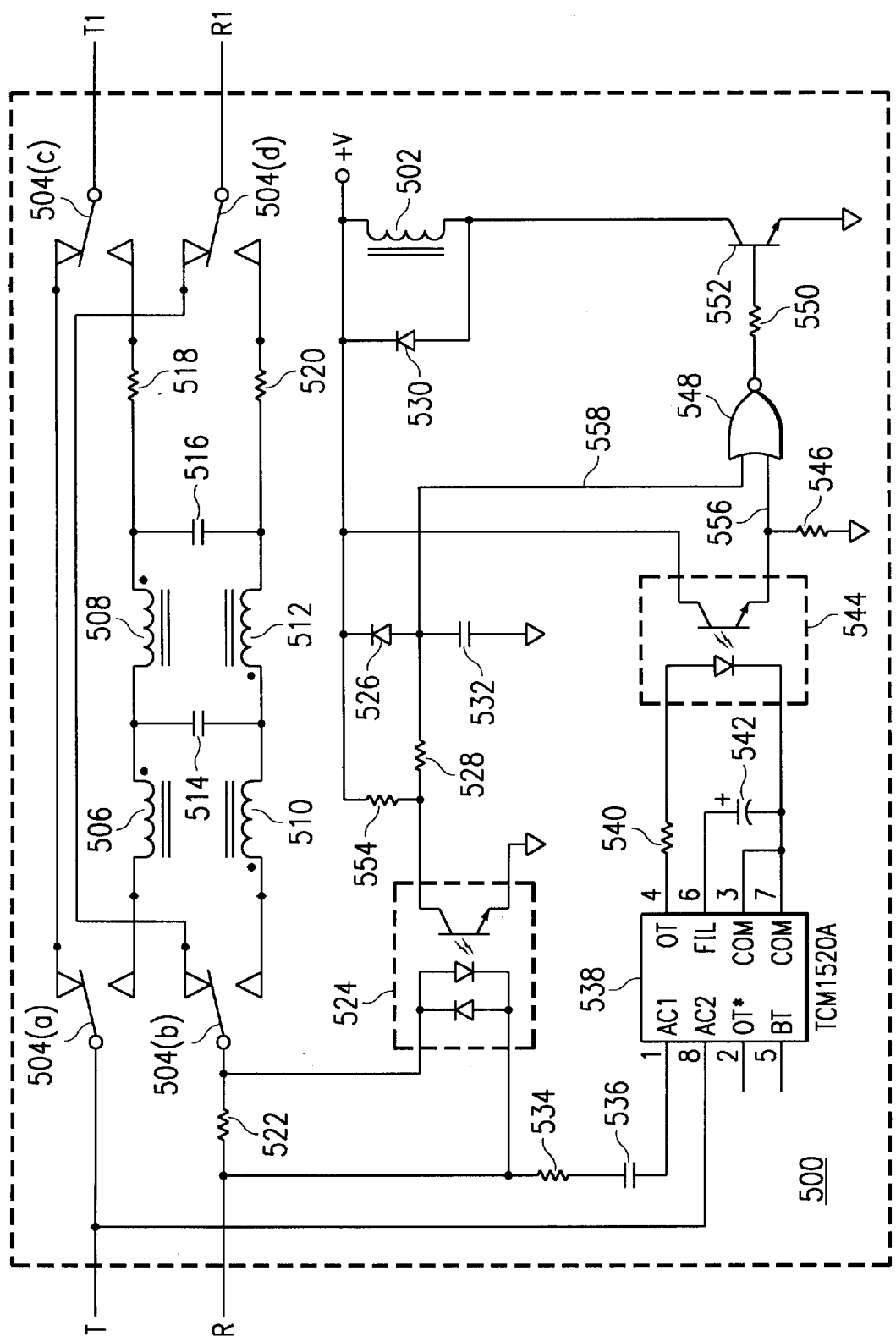
FIG. 6 is a detailed component diagram of an enhanced version of the xDSL Multiple-Point Interface Device section of FIG. 3.

FIG. 6 shows a detailed component diagram of an enhanced version of the xDSL Multiple-Point Interface Device section of FIG. 3 enabling the low-pass filter of FIG. 2, or alternatively, a bandpass or a high-pass filter or other signal transform device, to be selectively inserted in or removed from the telephone line as the associated telephone is taken off-hook or placed on-hook respectively. In the illustrative example which follows, a low-pass filter is described as being inserted or removed. However, persons skilled in the art will recognize that other networks or signal transform devices are equally amenable for alternate or selective connection into or out of (i.e., bypassing) the telephone line circuits such as those described herein. In the automatic MPID 500 of FIG. 6, the low pass filter of FIG. 3 includes inductors 506, 508, 510 and 512, capacitors 514 and 516 and resistors 518 and 520. The terminals of the filter of FIG. 3 are connected respectively to the normally open contacts of relay 502, with the input for the T line connected to contact set 504(a), the input from the R line fed to contact set 504(b), the output to the T$_1$ line connected to contact set 504(c), and the output to the R$_1$ line connected to set 504(d). Contact sets 504(a) and 504(b) together form an input switching network. Similarly, contact sets 504(c) and 504(d) form an output switching network. The normally closed contacts of contact sets 504(a) and 504(c) provide a pass-through or bypass conductive path for line T–T$_1$. The normally closed contact sets 504(b) and 504(d) provide a pass-through or bypass conductive path for line R–R$_1$. Lines T and R are coupled respectively to the wipers of contact sets 504(a) and 504(b). Similarly, the wipers of contact sets 504(c) and 504(d) are respectively coupled to lines T$_1$ and R$_1$. In series with the R line and the wiper of contact set 504(b) is resistor 522 for sensing loop current to provide an off-hook/on-hook indication. The pass through condition exists when the telephone set connected to lines T$_1$ and R$_1$ is on-hook and relay 502 is released.

Continuing with FIG. 6, the input of optocoupler 524 is connected across resistor 522. Relay 502 is connected between a voltage supply +V and the collector of driver transistor 552. The emitter of driver transistor 552 is connected to ground. The output of NOR gate 548 is coupled to the base of driver transistor 552 through bias resistor 550. Resistor 554 is coupled to the collector output terminal of optocoupler 524. The emitter of the optocoupler 524 is connected to ground. The output collector of optocoupler 524 is also coupled to input 558 of NOR gate 548 through resistor 528. A capacitor 532 is coupled from input 530 of NOR gate 548 to ground. The anode of diode 526 is connected to input 558 of NOR gate 548 and the junction of resistor 528 and capacitor 532. The cathode of diode 526 is connected to the positive supply +V.

Continuing further with FIG. 6, one end of resistor 534 s connected to line R and the end of resistor 522 opposite the wiper of contact set 504(b). The other end of resistor 534 is coupled to terminal 1 of integrated circuit (IC) 538 through capacitor 536. Line T is connected to terminal 8 of IC 538. IC 538 is a ring detector circuit, available for example, from Texas Instruments as type number TCM1520A. Ring voltage is applied to terminals 1 and 8. In this application of IC 538, terminals 2 and 5 are not used and terminals 3 and 7 are connected to ground. The ring detect output, terminal 4 of IC 538, is coupled to the high side input of optocoupler 544 through resistor 540. The low side input of optocoupler 544 is connected to ground. A filter capacitor 542 is connected from terminal 6 of IC 538 to ground. The output collector of optocoupler 544 is connected to the positive supply +V. The emitter output terminal of optocoupler 544 is connected to input 556 of the NOR gate 548. Pull-down resistor 546 is connected from the emitter output terminal of optocoupler 544 to ground.

In operation, the loop current detection circuit determines when the telephone set connected across $T_1$–$R_1$ goes off-hook. Upon detection of the off-hook signal voltage developed across R522, current flows in the input to optocoupler 524 and causes its output to provide a path to ground. The path to ground through resistor 528 and the output of optocoupler 524 discharges capacitor 532 toward ground. When the logic switching threshold at input 558 of NOR gate 548 is reached, NOR gate 548 then produces a corresponding high logic level at its output. This high logic level then causes NPN driver transistor 552 to conduct via bias resistor 550 to energize relay 502. When energized, relay 502 causes contact sets 504(a) . . . (d) to close and connect the low pass filter section in the line between the telephone company central office equipment connected across T and R and the telephone set connected across T1 and R1.

In order to prevent false triggering of the loop current detection circuit from ring voltage, the ring detector circuit is employed to inhibit the loop current detector output. When an incoming ring signal begins, ring voltage passes through voltage dropping resistor 534, direct current blocking capacitor 536, to the ring detector IC 538. The output of IC 538 is then filtered by capacitor 542 and drives optocoupler 544 through voltage dropping resistor 540. The output of the optocoupler 544 then connects input 556 of NOR gate 548 to the positive voltage supply, overriding pull-down resistor 546 and forcing the output of NOR gate 548 to a "0" or "low" logic level. This "low" logic level keeps relay 502 from energizing and operating contact sets 504(a) . . . (d). Thus, the low pass filter section is not applied to the line.

Other features of the circuitry of FIG. 6 are for support of the loop current detector. Resistor 522 is employed to provide the off-hook signal voltage input to optocoupler 524. Diode 530 is used to keep inductive voltage spikes, caused when the relay 502 is de-energized, from damaging NPN transistor 552. Diode 526 is used to drain charge from capacitor 532 when power is not applied so that it is appropriately discharged to an initial known state prior to powering up the circuit. Resistor 554 in series with resistor 528 in conjunction with capacitor 532 are used to provide a time delay for the telephone set on-hook indication for a predetermined duration so that pulse dialing and impulse noise on the line do not cause inadvertent improper operation of the relay 502 or to otherwise adjust the response of the selector. Resistor 528 in conjunction with capacitor 532 is used for a time delay for the telephone set off-hook indication so that if an incoming ring signal is present, the ring signal control will have sufficient time to override the off-hook indication, thus preventing a false off-hook indication.

In a variation of the embodiment shown in FIG. 6, parameters indicating loading changes on the telephone subscriber line at terminals T or R may be sensed instead of the loop current flowing in a customer device. A control signal developed thereby, by circuitry not shown but well known to persons skilled in the art, may thus be used to select an appropriate configuration of one or more MPID devices in the customer's system.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A signal coupling interface for use in a two line telephone subscriber line, comprising:
   a filter network having two input lines and two output lines;
   a first switching network for selectively coupling said input lines of said filter network to said telephone subscriber line;
   a second switching network for selectively coupling said output lines of said filter network to a select one of a plurality of communication devices utilizing said telephone subscriber line;
   a bypass network, said bypass network connected by said first and second switching networks between the telephone subscriber line and said one of the communication devices where said filter network is not selectively coupled thereby;
   a loop current detector responsive to changes in the loop current in the subscriber line input to said first switching network; and
   a selector responsive to an output of said loop current detector, operable for alternately connecting said bypass network or said filter network between the subscriber lines and the one of the communication devices.

2. The apparatus of claim 1, wherein characteristics of said filter network vary with loading of said telephone subscriber line by other equipment connected thereto.

3. The apparatus of claim 2, wherein said filter network provides a low pass response characteristic.

4. The apparatus of claim 2, wherein said filter network provides a high pass response characteristic.

5. The apparatus of claim 4, wherein said filter network includes a maintenance signature circuit.

6. The apparatus of claim 2, wherein characteristics of the signal coupling interface are switch selectable for adapting to voice-band or high-speed devices.

7. The apparatus of claim 2 wherein a said communication device includes hook switch means for activation of said communication device.

8. The apparatus of claim 7, wherein said changes in said loop current are responsive to operation of said hook switch in a said communication device.

9. The apparatus of claim 1, wherein said output of said loop current detector is isolatively coupled to said selector.

10. The apparatus of claim 1, and further comprising a ring detector having an output responsive to ring signals present at said telephone subscriber line.

11. The apparatus of claim 10, wherein the signal coupling interface is configured for mounting on a wall.

12. The apparatus of claim 1, wherein said output of said loop current detector is coupled through a time delay circuit to said selector to delay operation of said selector for a predetermined duration of time.

13. The apparatus of claim 1, wherein said signal coupling interface is separately packaged for individual series insertion in a branch line coupling a communication device to said subscriber line.

* * * * *